US011681864B2

(12) United States Patent
Emmart et al.

(10) Patent No.: US 11,681,864 B2
(45) Date of Patent: Jun. 20, 2023

(54) EDITING PARAMETERS

(71) Applicant: BLACKBOILER, INC., Arlington, VA (US)

(72) Inventors: Liam Roshan Dunan Emmart, Washington, DC (US); Jonathan Herr, Washington, DC (US); Daniel P. Broderick, Ashburn, VA (US); Daniel Edward Simonson, Syracuse, NY (US)

(73) Assignee: BLACKBOILER, INC., Arlington, VA (US)

( * ) Notice: Subject to any disclaimer, the term of this patent is extended or adjusted under 35 U.S.C. 154(b) by 0 days.

(21) Appl. No.: 17/562,352

(22) Filed: Dec. 27, 2021

(65) Prior Publication Data
US 2022/0215158 A1   Jul. 7, 2022

Related U.S. Application Data (60) Provisional application No. 63/133,568, filed on Jan. 4, 2021.

(51) Int. Cl.
*G06F 40/166* (2020.01)
*G06F 40/40* (2020.01)
(52) U.S. Cl.
CPC ............ *G06F 40/166* (2020.01); *G06F 40/40* (2020.01)
(58) Field of Classification Search
CPC .................... G06F 40/166; G06F 40/40
(Continued)

(56) References Cited

U.S. PATENT DOCUMENTS

| 5,692,206 | A | 11/1997 | Shirley | |
|---|---|---|---|---|
| 6,253,177 | B1* | 6/2001 | Lewis | G10L 15/22 |
| | | | | 704/E15.04 |

(Continued)

FOREIGN PATENT DOCUMENTS

| CA | 2901055 A1 | 2/2017 |
|---|---|---|
| WO | 0244932 A2 | 6/2002 |

OTHER PUBLICATIONS

Zhemin Zhu et al., A Monolingual Tree-based Translation Model for Sentence Simplification, Proceedings of the 23rd International Conference on Computational Linguistics (Coling 2010), pp. 1353-1361, Beijing, Aug. 2010.

(Continued)

*Primary Examiner* — Thierry L Pham
(74) *Attorney, Agent, or Firm* — Rothwell, Figg, Ernst & Manbeck, P.C.

(57) ABSTRACT

In some embodiments, a method is provided for updating an editing parameter for a model for automatically suggesting revisions to text data. The method may include displaying, on a graphical user interface (GUI) of a user device, one or more interactive input elements, wherein each of the one or more input elements is associated with an editing parameter for a model for automatically suggesting revisions to text data. The method may include receiving, via the GUI, an input from a selected input element of the one or more input elements, wherein the input comprises an indication of a value for a selected editing parameter associated with the selected input element. The method may include updating the selected editing parameter for the model based on the value. The method may include using the model with the updated selected editing parameter to apply an edit operation to an obtained text-under-analysis.

23 Claims, 7 Drawing Sheets

(58) Field of Classification Search
USPC .......................................................... 704/210
See application file for complete search history.

(56) References Cited

U.S. PATENT DOCUMENTS

| | | | |
|---|---|---|---|
| 6,438,543 | B1 | 8/2002 | Kazi |
| 7,080,076 | B1 | 7/2006 | Williamson |
| 7,519,607 | B2 | 4/2009 | Anderson, IV |
| 7,668,865 | B2 | 2/2010 | Mcdonald |
| 8,037,086 | B1 | 10/2011 | Upstill |
| 8,046,372 | B1 | 10/2011 | Thirumalai |
| 8,196,030 | B1 | 6/2012 | Wang |
| 8,442,771 | B2 | 5/2013 | Wang |
| 8,788,523 | B2 | 7/2014 | Martin et al. |
| 8,886,648 | B1 | 11/2014 | Procopio et al. |
| 9,514,103 | B2 | 12/2016 | Kletter |
| 9,672,206 | B2 | 6/2017 | Carus |
| 10,102,193 | B2 | 10/2018 | Riediger |
| 10,127,212 | B1 | 11/2018 | Kim |
| 10,191,893 | B2 | 1/2019 | Riediger |
| 10,216,715 | B2 | 2/2019 | Brockerick |
| 10,489,500 | B2 | 11/2019 | Herr |
| 10,515,149 | B2 | 12/2019 | Herr |
| 10,713,436 | B2 | 7/2020 | Herr |
| 10,755,033 | B1 | 8/2020 | Dass |
| 10,824,797 | B2 | 11/2020 | Herr |
| 10,970,475 | B2 | 4/2021 | Herr |
| 2002/0002567 | A1 | 1/2002 | Kanie |
| 2003/0023539 | A1 | 1/2003 | Wilce |
| 2003/0069879 | A1 | 4/2003 | Sloan |
| 2003/0074633 | A1 | 4/2003 | Boulmakoul |
| 2004/0102958 | A1 | 5/2004 | Anderson |
| 2005/0182736 | A1 | 8/2005 | Castellanos |
| 2007/0073532 | A1 | 3/2007 | Brockett et al. |
| 2007/0106494 | A1 | 5/2007 | Detlef et al. |
| 2007/0192355 | A1 | 8/2007 | Vasey |
| 2007/0192688 | A1 | 8/2007 | Vasey |
| 2007/0300295 | A1 | 12/2007 | Kwok |
| 2008/0103759 | A1* | 5/2008 | Dolan et al. |
| 2009/0007267 | A1 | 1/2009 | Hoffmann |
| 2009/0076792 | A1 | 3/2009 | Lawson-Tancred |
| 2009/0099993 | A1 | 4/2009 | Seuss |
| 2009/0138257 | A1 | 5/2009 | Verma |
| 2009/0138793 | A1 | 5/2009 | Verma |
| 2009/0216545 | A1 | 8/2009 | Rajkumar et al. |
| 2009/0300064 | A1 | 12/2009 | Dettinger |
| 2009/0300471 | A1 | 12/2009 | Dettinger |
| 2010/0005386 | A1 | 1/2010 | Verma |
| 2011/0055206 | A1 | 3/2011 | Martin |
| 2012/0011433 | A1 | 1/2012 | Skrenta et al. |
| 2013/0036348 | A1 | 2/2013 | Hazard |
| 2013/0091422 | A1 | 4/2013 | Potnis |
| 2013/0151235 | A1 | 6/2013 | Och |
| 2014/0040270 | A1 | 2/2014 | O'Sullivan |
| 2015/0347393 | A1 | 12/2015 | Futrell |
| 2015/0379887 | A1 | 12/2015 | Becker |
| 2016/0012061 | A1 | 1/2016 | Sperling |
| 2016/0055196 | A1 | 2/2016 | Collins |
| 2016/0224524 | A1 | 8/2016 | Kay |
| 2017/0039176 | A1 | 2/2017 | Broderick et al. |
| 2017/0161260 | A1 | 6/2017 | Broderick |
| 2017/0287090 | A1 | 10/2017 | Hunn |
| 2017/0364495 | A1 | 12/2017 | Srinivasan |
| 2018/0005186 | A1 | 1/2018 | Hunn |
| 2018/0253409 | A1 | 9/2018 | Carlson |
| 2018/0268506 | A1 | 9/2018 | Wodetzki |
| 2018/0365201 | A1 | 12/2018 | Hunn |
| 2018/0365216 | A1 | 12/2018 | Kao |
| 2019/0065456 | A1 | 2/2019 | Platow |
| 2020/0089752 | A1 | 3/2020 | Herr et al. |
| 2020/0380541 | A1* | 12/2020 | Laing ................. G06Q 30/0251 |

OTHER PUBLICATIONS

Bill Maccartney, Michel Galley, Christopher D. Manning, A Phrase-Based Alignment Model for Natural Language Inference, Proceedings of the 2008 Conference on Empirical Methods in Natural Language Processing, pp. 802-811, Honolulu, Oct. 2008.

Ion Androutsopoulos and Prodromos Malakasiotis, A Survey of Paraphrasing and Textual Entailment Methods, Journal of Artificial Intelligence Research 38 (2010) 135-187 Submitted Dec. 2009; published May 2010.

Marie-Catherine De Marneffe, Trond Grenager, Bill Maccartney, Daniel Cer, Daniel Ramage, Chlo'e Kiddon, Christopher D. Manning, Aligning semantic graphs for textual inference and machine Yeading, American Association for Artificial Intelligence, 2006.

Bill Maccartney and Christopher D. Manning, An extended model of natural logic, Proceedings of the 8th International Conference on Computational Semantics, pp. 140-156, Tilburg, Jan. 2009.

MD Arafat Sultan, Steven Bethard and Tamara Sumner, Back to Basics for Monolingual Alignment Exploiting Word Similarity and Contextual Evidence, Transactions of the Association for Computational Linguistics, 2(2014) 219-230. Action Editor: Alexander Koller. Submitted Nov. 2013; Revised Jan. 2014; Published May 2014.

Rada Mihalcea, Courtney Corley, Carlo Strapparava, Corpus-based and Knowledge-based Measures of Text Semantic Similarity, American Association for Artificial Intelligence, p. 775-780, 2006.

Rohit J. Kate, A Dependency-based Word Subsequence Kernel, Proceedings of the 2008 Conference on Empirical Methods in Natural Language Processing, pp. 400-409, Honolulu, Oct. 2008.

Yangfeng Ji and Jacob Eisenstein, Discriminative Improvements to Distributional Sentence Similarity, Proceedings of the 2013 Conference on Empirical Methods in Natural Language Processing, pp. 891-896, Seattle, Washington, USA, Oct. 18-21, 2013.

Richard Socher, Eric H. Huang, Jeffrey Pennington, Andrew Y. Ng, Christopher D. Manning, Dynamic Pooling and Unfolding Recursive Autoencoders for Paraphrase Detection, Advances in Neural Information Processing Systems 24, Jan. 2011.

Michael Heilman and Noah A. Smith, Extracting Simplified Statements for Factual Question Generation, Mar. 29, 2010.

Amit Bronner and Christof Monz, User Edits Classification Using Document Revision Histories, Proceedings of the 13th Conference of the European Chapter of the Association for Computational Linguistics, pp. 356-366, Avignon, France, Apr. 23-27, 2012.

Felix Hill, Kyunghyun Cho, Anna Korhonen, Learning Distributed Representations of Sentences from Unlabelled Data, CoRR, abs/1602.03483, 2016, available at: http://arxiv.org/abs/1602.03483.

Shashi Narayan, Claire Gardent. Hybrid Simplification using Deep Semantics and Machine Translation, the 52nd Annual Meeting of the Association for Computational Linguistics, Jun. 2014, Baltimore, United States, pp. 435-445, 2014, Proceedings of the 52nd Annual Meeting of the Association for Computational Linguistics.

Kristian Woodsend and Mirella Lapata, Learning to Simplify Sentences with Quasi-Synchronous Grammar and Integer Programming, Proceedings of the 2011 Conference on Empirical Methods in Natural Language Processing, pp. 409-420, Edinburgh, Scotland, UK, Jul. 27-31, 2011.

Bill Maccartney, Christopher D. Manning, Modeling Semantic Containment and Exclusion in Natural Language Inference, Proceeding COLING '08 Proceedings of the 22nd International Conference on Computational Linguistics—vol. 1 pp. 521-528 Association for Computational Linguistics Stroudsburg, PA, USA, 2008.

Bill Maccartney, Christopher D. Manning, Modeling Semantic Containment and Exclusion in Natural Language Inference (a presentation), Aug. 2008.

Hua He and Jimmy Lin, Pairwise Word Interaction Modeling with Deep Neural Networks for Semantic Similarity Measurement, Proceedings of NAACL-HLT 2016, pp. 937-948, San Diego, California, Jun. 12-17, 2016.

Dr. Radim Rehurek, scalability of semantic analysis in natural language processing, PH.D Thesis, May 2011.

Richard Socher Brody Huval Christopher D. Manning Andrew Y. Ng, Semantic Compositionality through Recursive Matrix-Vector Spaces, Proceedings of the 2012 Joint Conference on Empirical (56) References Cited

OTHER PUBLICATIONS

Methods in Natural Language Processing and Computational Natural Language Learning, pp. 1201-1211, Jeju Island, Korea, Jul. 12-14, 2012.
Ilya Sutskever, Oriol Vinyals, Quoc V. Le, Sequence to Sequence Learning with Neural Networks, Advances in neural information processing systems, pp. 3104-3112, 2014.
Ryan Kiros, Yukun Zhu, Ruslan Salakhutdinov, Richard S. Zemel, Antonio Torralba, Raquel Urtasun, Sanja Fidler, Skip-Thought Vectors, arXiv:1506.06726, Jun. 2015.
Radim Rehurek and Petr Sojka, Software Framework for Topic Modeling with Large Corpora, In Proceedings of LREC 2010 workshop New Challenges for NLP Frameworks. Valletta, Malta: University of Malta, 2010. s. 46-50, 5 s. ISBN 2-9517408-6-7.
Samuel R. Bowman, Jon Gauthier, Abhinav Rastogi, Raghav Gupta, Christopher D. Manning, Christopher Potts, A Fast Unified Model for Parsing and Sentence Understanding, arXiv:1603.06021, Mar. 2016.
Xiang Zhang, Yann Lecun, Text Understanding from Scratch, arXiv:1502.01710, Apr. 2016.
Furong Huang, Animashree Anandkumar, Unsupervised Learning of Word-Sequence Representations from Scratch via Convolutional Tensor Decomposition, arXiv:1606.03153, Jun. 2016.
Chambers, N. and Jurafsky, D., "Unsupervised learning of narrative event chains," Proceedings of ACL-08, Columbus, Ohio, Jun. 2008, pp. 789-797.
Chambers, N. and Jurafsky, D., "Unsupervised learning of narrative schemas and their participants," Proceedings of the 47th Annual Meeting of the ACL and the 4th IJCNLP of the AFNLP, Suntec, Singapore, Aug. 2-7, 2009, pp. 602-610.
Chen, D. and Manning, C. D., "A fast and accurate dependency parser using neural networks," Proceedings of the 2014 Conference on Empirical Methods in Natural Language Processing, Doha, Qatar, Oct. 25-29, 2014, pp. 740-750.
Justeson, J. S. and Katz, S. M., "Technical terminology: some linguistic properties and an algorithm for identification in text," 1995, Natural Language Engineering 1(1):9-27.

Honnibal, M. and Johnson, M., "An improved non-monotonic transition system for dependency parsing," Proceedings of the 2015 Conference on Empirical Methods in Natural Language Processing, Lisbon, Portugal, Sep. 17-21, 2015, pp. 1373-1378.
Petrov, S., et al., "Learning accurate, compact, and interpretable tree annotation," Proceedings of the 21st International Conference on Computational Linguistics and 44th Annual Meeting of the ACL, Sydney, Australia, Jul. 2006, pp. 433-440.
Simonson, D. E., "Investigations of the properties of narrative schemas," a dissertation submitted to the Faculty of the Graduate School of Arts and Sciences of Georgetown University, Washington, DC, Nov. 17, 2017, 259 pages.
Aswani, N., and Gaizauskas, R., "A hybrid approach to align sentences and words in English-Hindi parallel corpora," Jun. 2005, Proceedings of the ACL Workshop on Building and Using Parallel Texts, Association for Computation Linguistics, pp. 57-64.
Manning, C. D., and Schütze, H., Foundations of statistical natural language processing, 1999, The MIT Press, Cambridge, MA, 44 pages.
International Search Report and Written Opinion issued for PCT/US2019/023854 dated Jun. 27, 2019, 17 pages.
Office Action in related Canadian application No. 3,076,629 dated May 13, 2020, 4 pages.
Office Action for Canadian Patent Application No. 3,076,629 dated Oct. 26, 2021, 7 pages.
Communication pursuant to Article 94(3) in European application No. 19 716 654.9 dated Feb. 4, 2021, 9 pages.
Office Action in Canadian application No. 3,076,629 dated Apr. 9, 2021, 6 pages.
Office Action in Canadian application No. 3,076,629 dated Nov. 25, 2020, 4 pages.
International Search Report and Written Opinion for PCT/US2019/057906 dated Jan. 30, 2020, 13 pages.
International Search Report and Written Opinion for PCT/US21/65194 dated Mar. 24, 2022, 11 pages.

* cited by examiner

Point Edit Settings

Bucket Sizes

Accept: [25] ~310A
Reject: [25] ~310B
Revise: [25] ~310C

Bucket Weights

Accept: [1] ~320A
Reject: [1] ~320B
Revise: [1] ~320C

340 — Reset to Client Defaults

Similarity (%)

330A ─○────── [0.62] ~330B

Accept Threshold (%)

350A ─○────── [0.8] ~350B

370 — [Clear]  380 — [Save]

EDITING PARAMETERS

CROSS-REFERENCE TO RELATED APPLICATIONS

This application is a non-provisional of, and claims the priority benefit of, U.S. Prov. Pat. App. No. 63/133,568 filed Jan. 4, 2021, which is hereby incorporated by reference in its entirety.

TECHNICAL FIELD

Aspects of the present disclosure relate to updating one or more editing parameters for a model for automatically suggesting revisions to text data. Aspects of the present disclosure relate generally to machine learning and natural language processing applications used to suggest revisions to text data.

BACKGROUND

Methods and system for suggesting edits to a document may encompass, generally, breaking a document-under-analysis ("DUA") into many statements-under-analysis ("SUA") and then comparing the SUA's against a "seed database" of past edits to determine if the SUA can be edited in the same way. The seed database of past edits includes "original text" and "final text" representing, respectively, an unedited text and the corresponding edit thereto. The method and system includes, generally, calculating a similarity score between the SUA and each of the "original texts" from the database. For original texts that have a similarity score that exceed a threshold, the SUA and the original text are "aligned" and the edit from the corresponding "final text" is applied to the SUA to produce an edited SUA ("ESUA"). The ESUA can then be inserted into the DUA in place of the SUA. The SUA and corresponding ESUA can then be added to the seed database.

There, however, may be no single "best" similarity metric and instead, the optimal metric may vary depending on, among other things, the type of edit that was applied to the original text in the seed database. Thus, the "best" similarity metric may be selected in view of the type of edit applied to the original text in the seed database. Moreover, the alignment method used between the SUA, original text, and final text may be optimally selected based on the type of edit.

Generally speaking, an "edit operation" means that between the original text and the final text, some text was deleted, replaced, inserted. The concept of "type of edit" refers to the type of edit operation that was performed on the original text in the seed database to get to the final text in the seed database. Non-limiting examples of the "type of edit" can include, for example, a full sentence edit, a parenthetical edit, a single word edit, a structured list edit, an unstructured list edit, or a fronted constituent edit.

A type of edit can be a "full sentence delete" such as deleting the sentence: "In the event disclosing party brings suit to enforce the terms of this Agreement, the prevailing party is entitled to an award of its attorneys' fees and costs."

A type of edit can be a "full sentence replace" such as deleting "Receipt of payment by the Contractor from the Owner for the Subcontract Work is a condition precedent to payment by the Contractor to the Subcontractor," and replacing it with "In no event and regardless of any paid-if-paid or pay-when-paid contained herein, will Contractor pay the Subcontractor more than 60 days after the Subcontractor completes the work and submits an acceptable payment application."

A type of edit can be a "full sentence insert," which can be performed after a particular sentence, or a sentence having a particular meaning, for example, inserting after "In the event of Recipient's breach or threatened breach of this Agreement, Disclosing Party is entitled, in addition to all other remedies available under the law, to seek injunctive relief." the following sentence: "In no event; however, will either Party have any liability for special or consequential damages."

A type of edit can be a "full sentence insert," which can be performed where an agreement is lacking required specificity, for example inserting: "The Contractor shall provide the Subcontractor with the same monthly updates to the Progress Schedule that the Contractor provides to the Owner, including all electronic files used to produce the updates to the Progress Schedule."

A type of edit can be a "structured list delete", for example, deleting clause (b) from the following sentence "Subcontractor shall indemnify Contractor against all damages caused by the following: (a) Subcontractor's breach of the terms of this Agreement, (b) Contractor's failure to properly design the Project, and (c) Subcontractor's lower-tier subcontractor's failure to properly perform their work."—"Subcontractor shall indemnify Contractor against all damages caused by the following: (a) Subcontractor's breach of the terms of this Agreement, and (b) Subcontractor's lower-tier subcontractor's failure to properly perform their work."

A type of edit can be a "structured list insert" such as inserting clause (d) into the following sentence: "Confidential Information shall not include (a) information that is in the public domain prior to disclosure, (b) information that Recipient currently possesses, and (c) information that becomes available to Recipient through sources other than the Disclosing Party."—"Confidential Information shall not include (a) information that is in the public domain prior to disclosure, (b) information that Recipient currently possesses, (c) information that becomes available to Recipient through sources other than the Disclosing Party, and (d) information that Recipient independently develops."

A type of edit can be a "leaf list insert" such as inserting "studies" into the following sentence: "The 'Confidential Information,' includes, without limitation, computer programs, names and expertise of employees and consultants, know-how, formulas, studies, processes, ideas, inventions (whether patent-able or not) schematics and other technical, business, financial, customer and product development plans, forecasts, strategies and information."

A type of edit can be an "leaf list delete" such as deleting "attorneys' fees" from the following sentence: Subcontractor shall indemnify Contractor against all damages, fines, expenses, attorneys' fees, costs, and liabilities arising from Subcontractor's breach of this Agreement."

A type of edit can be a "point delete" such as deleting "immediate" from the following sentence: "Recipient will provide immediate notice to Disclosing Party of all improper disclosers of Confidential Information."

A type of edit can be a "span delete" such as deleting "consistent with the Project Schedule and in strict accordance with and reasonable inferable from the Subcontract Documents" from the following sentence: "The Contractor retains the Subcontractor as an independent contractor, to provide all labour, materials, tools, machinery, equipment and services necessary or incidental to complete the part of the work which the Contractor has contracted with the Owner to provide on the Project as set forth in Exhibit A to this Agreement, consistent with the Project Schedule and in strict accordance with and reasonably inferable from the Subcontract Documents."

A type of edit can be a "point replace" such as replacing "execute" with "perform" in the following sentence: "The Subcontractor represents it is fully experienced and qualified to perform the Subcontract Work and it is properly equipped, organized, financed and, if necessary, licensed and/or certified to execute the Subcontract Work."

A type of edit can be a "point insert" such as the insertion of "reasonably" in the following sentence: "The Subcontractor shall use properly-qualified individuals or entities to carry out the Subcontract Work in a safe and reasonable manner so as to reasonably protect persons and property at the site and adjacent to the site from injury, loss or damage."

A type of edit can be an "fronted constituent edit" such as inserting "Prior to execution of the Contract" in the following sentence: "Prior to execution of the Contract, Contractor shall provide Subcontractor with a copy of the Project Schedule."

A type of edit can be an "end of sentence clause insert" such as inserting "except as set forth specifically herein as taking precedence over the Contractor's Contract with the Owner" in the following sentence: "In the event of a conflict between this Agreement and the Contractor's Contract with the Owner, the Contractor's Contract with the Owner shall govern, except as set forth specifically herein as taking precedent over the Contractor's Contract with the Owner."

A type of edit can be a "parenthetical delete" such as deleting "(as evidenced by its written records)" in the following sentence: "The term 'Confidential Information' and the restrictions set forth in Clause 2 and Clause 5 of this Schedule 'B' shall not apply to information which was known by Recipient (as evidenced by its written records) prior to disclosure hereunder, and is not subject to a confidentiality obligation or other legal, contractual or fiduciary obligation to Company or any of its Affiliates."

A type of edit can be a "parenthetical insert" such as inserting "(at Contractor's sole expense)" in the following sentence: "The Contractor shall (at Contractor's sole expense) provide the Subcontractor with copies of the Subcontract Documents, prior to the execution of the Subcontract Agreement."

An alignment method may be selected base on an edit-type classification. The alignment methods may include, for example, a point edit type alignment, semantic alignment, span edit type alignment, full edit type alignment, and list edit type alignment.

SUMMARY

According to some embodiments disclosed herein, an interface is provided for configuring runtime behavior of the edit suggestion system by customizing global, model, and cluster level parameters. Many fields may be generated during training generation in order to model a client's preferences for editing texts under analysis—i.e., an "editing playbook"—and replicate preferred edits during the edit suggestion process. Some of these fields may need to be customized in order to deliver optimal edit suggestions to clients. A client may have several models to represent different playbooks, and each of these models may be customized separately.

Edits to text data may be broadly broken into two types: point edits and full edits. Point edits may include word substitutions, short phrase and word insertions, and deletions. Full edits may include full sentence or clause edits, such as inserting whole sentences or paragraphs to add text that is otherwise missing from a document. Clause edits may be learned as "clusters" of similar edits, which provides the edit suggestion system with multiple examples of scenarios in which these clauses were inserted.

In some embodiments, there may be global, model, and cluster-level parameters. Point edits may have several attributes or parameters that may be changed on a per-client and per-model basis. Clause edit may have several attributes or parameters that may be set at the model level and the cluster level. Cluster parameters may supersede model parameters, and model parameters may supersede global parameters, when present.

According to one aspect, a method for updating an editing parameter for a model for automatically suggesting revisions to text data is provided. The method includes displaying, on a graphical user interface (GUI) of a user device, one or more interactive input elements, wherein each of the one or more input elements is associated with an editing parameter for a model for automatically suggesting revisions to text data. The method includes receiving, via the GUI, an input from a selected input element of the one or more input elements, wherein the input comprises an indication of a value for a selected editing parameter associated with the selected input element. The method includes updating the selected editing parameter for the model based on the value. The method includes applying the model with the updated selected editing parameter to suggest a revision to an obtained text-under-analysis.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

DETAILED DESCRIPTION

Figure 1:
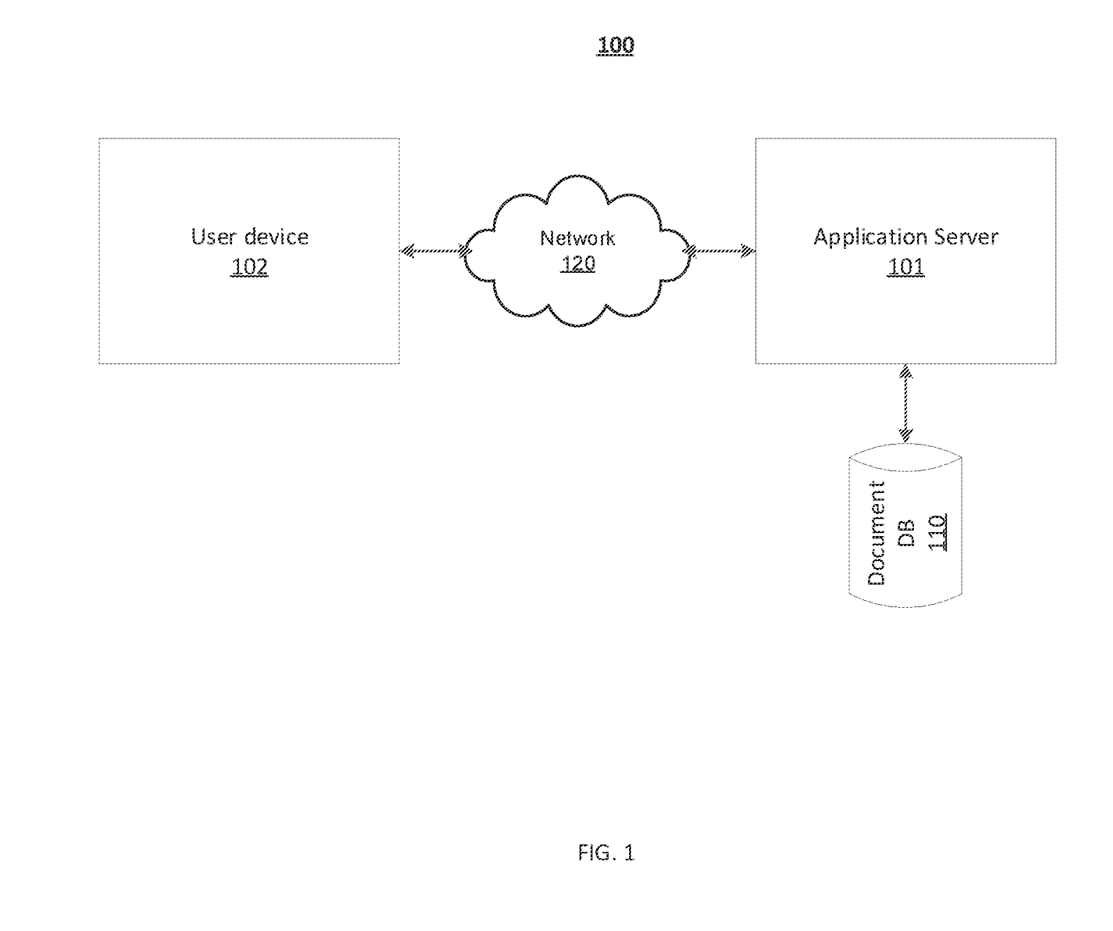
FIG. 1 is a block diagram illustrating a system for suggesting revisions to an electronic document, according to some embodiments.

FIG. 1 is a block diagram illustrating a system 100 for suggesting revisions to an electronic document, according to some embodiments. A user device 102, such as a computer, mobile device, tablet, and the like, may be in communication with one or more application servers 101. In some embodiments, the user device 102 is in communication with application server 101 via a network 120. In some embodiments, network 120 may be a local area network or a wide area network (e.g., the Internet).

In some embodiments, the system 100 may further include one or more data sources, such as a document database 110. The document database 110 may be configured to store one or more documents, such as, for example, a document under analysis (DUA). In some embodiments, the document database 110 may be referred to as a "seed database." The seed database of past edits may comprise "original text" and "final text" representing, respectively, an unedited text and the corresponding edit thereto.

In some embodiments, the user device 102, document database 110, and/or application server 101 may be co-located in the same environment or computer network, or in the same device.

In some embodiments, input to application server 101 from client device 102 may be provided through a web interface or an application programming interface (API), and the output from the application server 101 may also be served through the web interface or API.

While application server 101 is illustrated in FIG. 1 as a single computer for ease of display, it should be appreciated that the application server 101 may be distributed across multiple computer systems. For example, application server 101 may comprise a network of remote servers and/or data sources hosted on network 120 (e.g., the Internet) that are programmed to perform the processes described herein. Such a network of servers may be referred to as the backend of the system 100.

Aspects of the system 100, including edit suggestion and clause insertion features are described more fully in U.S. Pat. Nos. 10,216,715; 10,515,149; 10,713,436; 10,489,500; 10,824,797; 10,311,140; and 10,614,157, which are hereby incorporated by reference in their entirety.

According to some embodiments, user device 102 may be operative to display on a display device a user interface 200, discussed in further detail in connection with FIGS. 2-5. User interface 200 may comprise a graphical user interface with one or more interactive input elements.

Figure 2:
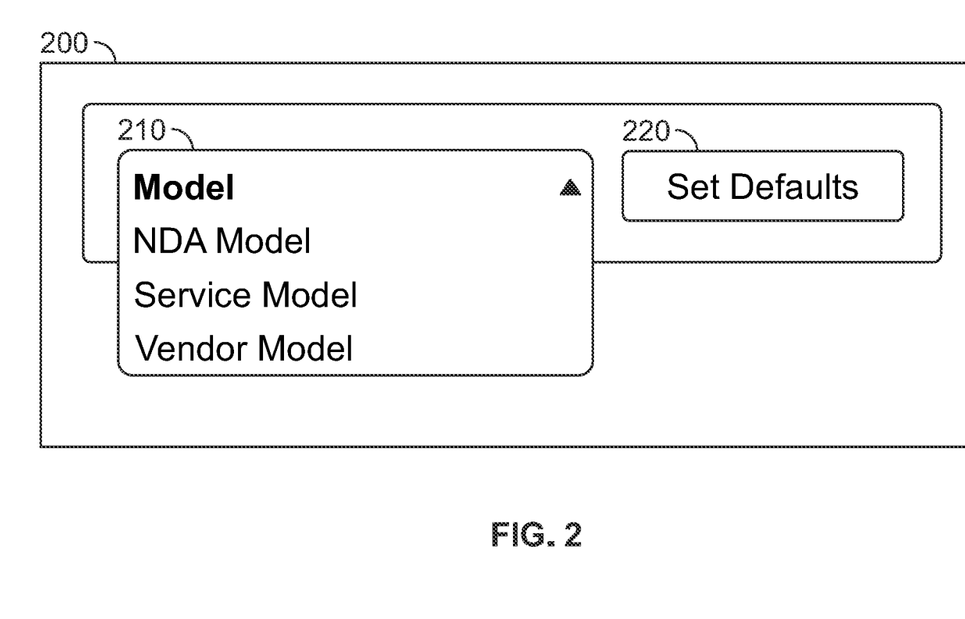
FIG. 2 is a screen capture of a user interface for selecting a model to use with a system for suggesting revisions to an electronic document, according to some embodiments.

FIG. 2 is a screen capture of a user interface for selecting a model to use with a system for suggesting revisions to an electronic document, according to some embodiments. According to some embodiments, a client or customer may have multiple models representing different playbooks for categories of documents. For example, a client may have a model associated with a playbook of preferences useful for suggesting edits to a non-disclosure agreement. As another example, a client may have a model associated with a playbook of preferences useful for suggesting edits to a service agreement. In addition, a client may have a model associated with a playbook of preferences useful for suggesting edits to a vendor agreement. Additional categories of documents may be associated with a specific model or playbook.

As used herein, a "model" may comprise a corpus of one or more text documents and a set of one or more parameters associated with the corpus. The parameters may include, for example, a set of user preferences, including one or more editing parameters as described more fully herein. In some embodiments, a model may include identifying information such as, for example, a name, stage (e.g., published, draft, backup), user who created and/or last modified the model, contract type, among other information.

As shown in FIG. 2, a GUI of user interface 200 may include an interactive input element 210 that enables a user to select a model from one or more models. FIG. 2 depicts a drop-down menu 210 where a user can specify one of a "NDA Model," "Service Model," or "Vendor Model" where the user wishes to adjust one or more editing parameters for a point edit or a full edit. In some embodiments, user interface 200 may include an interactive input element 220, such as a button, that when selected restores one or more default settings to a selected model of input element 210.

Figure 3:
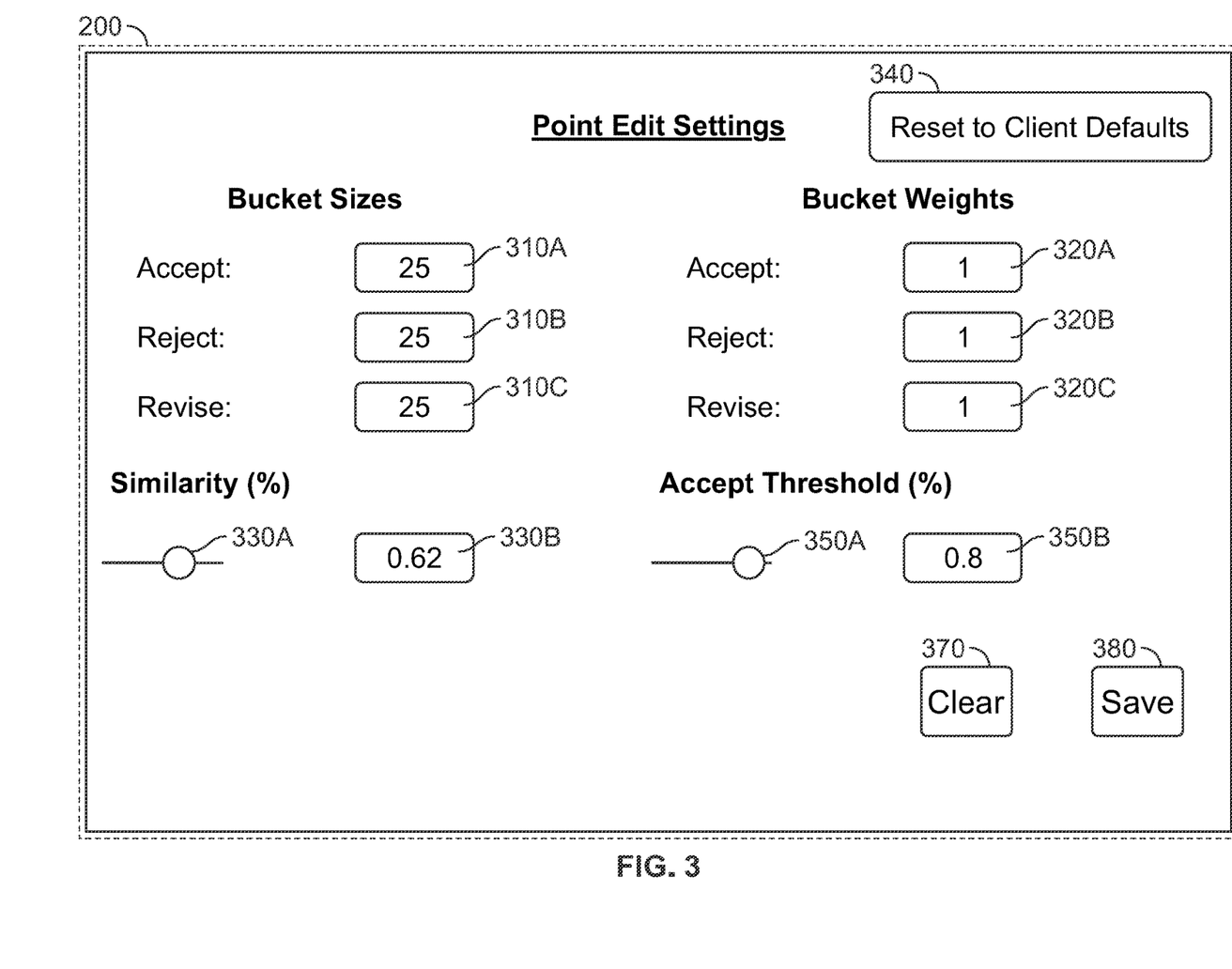
FIG. 3 is a screen capture of a user interface for selecting a point edit setting, according to some embodiments.

FIG. 3 is a screen capture of a user interface for selecting a point edit setting, according to some embodiments. As shown in FIG. 3, a GUI of user interface 200 may include one or more interactive input elements that allows a user to specify one or more attributes of a point edit. Point Edits may have several attributes that may be changed on a per-user, per-client (e.g., global), and/or per-model basis.

In some embodiments, these attributes may be set on a per-model basis so all such settings are applied once. Attributes may be saved independently. For example, model and cluster parameters may each be saved in the database separately and attached to different pieces of data, e.g., the model and individual members within groups of edits known as "clusters," but are applied jointly at runtime of evaluating a document. All settings may be applied at the same time, but in some embodiments, the parameters obey the following hierarchy: cluster parameters>model parameters>global parameters.

As shown in FIG. 3, a user may be able to adjust one or more point edit parameters, including a bucket size (310A-C), bucket weight (320A-C), a similarity level (330A-B), and/or an accept threshold (350A-B). In some embodiments, default values are initially displayed, and a user can edit default values and write them back to the application server 101. For example, a user may use the clear button 370 to reset or change the parameter settings, or the save button 380 to write the parameter settings to the application server 101.

A bucket size may refer to a number of training documents in the seed database that may be considered to suggest a point edit operation such as an "accept," "reject," or "revise" corresponding to an insertion, deletion, or revision edit operation of text data, respectively. A user may be able to use an interactive input element to specify a threshold bucket size for an accept (310A), reject (310B), or revise (310C) point edit operation that must be met in order for the edit operation system to suggest an accept, reject, or revise point edit operation. According to some embodiments, the reject edit operation (310B) may further encompass a full sentence or clause deletion edit operation of text data. According to some embodiments, a user, using the interactive input element (310A-310C), can change the value of the Accept/Reject/Revise bucket sizes from 0 to 100, with a default of about 25.

A bucket size may reflect the number of previous edits of a specific edit type (e.g., such as accept/reject/revise) that are considered against an individual statement under analysis (SUA). Effectively, previously stored data may be sampled to find some number "n" of training data examples that meet or exceed a specified similarity threshold (0-100%), and accordingly may be good candidates for making an edit. The collected samples may be used to compare against the SUA and evaluate a similarity between the SUA and each sample. If a "similar enough" sentence is found between the SUA and a sample in the database, the system evaluates the corresponding edit that was made to the sample and may suggest it for the SUA.

In one example, the system may obtain a document under analysis (DUA), and there may be over 50 edit samples in the database for an accept edit type. There may also be at least 25 edit samples for both reject and revise edit types. In some embodiments, the default bucket size parameter may be set at 25 for all three edit types. A specific user, however, may believe that the accept edits are more useful, are better examples, or are otherwise preferred than the reject and revise edit types, and accordingly would like to see all the examples with accept edits incorporated in the edit suggestion process to compare against each SUA in the DUA. To do so, the accept bucket size may be increased to 50 from 25, effectively attempting to introduce more accept edit samples from the database to increase the probability that an accurate accept edit is chosen.

A user, using the interactive input element, may further specify a weight to be applied to the bucket size(s) for a respective accept (320A), reject (320B), or revise (320C) edit operation. The edit suggestion system 100 may determine to suggest or not suggest a point edit operation after applying the specified weight to the bucket of text documents.

Bucket weights may work in tandem with bucket sizes. Whereas bucket size is about increasing the number of considered data points (e.g., how many examples to sample from the database), bucket weights is about exaggerating the effects of a selected "bucket" (group) of examples that are sampled from the database.

One on example for illustrative purposes, there may be 25 examples of accept and reject edit types that are similar enough to a SUA, but only 2 revise edit types. In one scenario, the revises may be considered more valuable, but are being effectively crowded out by the comparatively larger number of good and bad examples there are for the other edit types. By increasing the revise bucket weight, the edit suggestion system can increase the weighting of the revise bucket examples, e.g., by multiplying the current number of examples with good matches. Such weighing may help increase the chance that the revise edit operation would be selected during the editing process and be suggested as an edit for the SUA.

In addition, a user, using the interactive input element, may further specify a similarity value using one or more interactive input elements (330A-B). Training documents, and original and final texts contained therein, may be selected for use with edit suggestion system in connection with a statement under analysis if a calculated similarity value of the original text as compared to the statement under analysis meets or exceeds the similarity value. According to some embodiments, a user can set a similarity value between 0 and 1, and the system may default to 0.5. In some embodiments, the interactive input element may encompass a slider (330A) to adjust the similarity value from low (0) to high (1), and/or a user can input a similarity value between 0 and 1 (or scaled between 0-100) into a text box (330B).

The similarity value may be considered as a benchmark check during the editing process that restricts the addition of edit samples from the database to buckets of edit types (accept/reject/revise). The similarity value requires that each sample of the training data must be at least this benchmark amount (a similarity value) for the edit suggestion system to add it to the bucket (of some bucket size n) for consideration as an edit to the DUA, the document going through the editing process.

A user, using an interactive input element, may specify an acceptance threshold value (350A, 350B). In some embodiments, training documents may reflect that certain text has been accepted (as opposed to, e.g., rejected or revised) because the text has not been previously edited. Accordingly, in identifying potential edit operations, the system may determine that a sentence or text in a DUA is similar to text in the training data that has previously been accepted. The accept threshold accordingly requires that a text in samples of the training data must have been accepted by at least this benchmark amount (an accept threshold) for the edit suggestion system to identify the text as an accept. In some embodiments, the accept threshold value may be selected using slider bar 350A or a text box 350B. In some embodiments, the accept threshold is between 0 and 1 (or scaled between 0-100) in the text box 350A.

According to some embodiments, a user can reset to the default point edit values by selecting an interactive element, such as a 'Reset Default Settings' button (340). In some embodiments, defaults may be selected from expert knowledge and experience and may be adjusted from time to time to reflect certain needs. For example, a customer with a fewer number of documents might need more permissive or more restrictive defaults than a customer with many documents because depending on the edit quality (i.e. when the customer was originally manually editing the documents), it may be desirable to increase or decrease the influence of certain edits.

Figure 4:
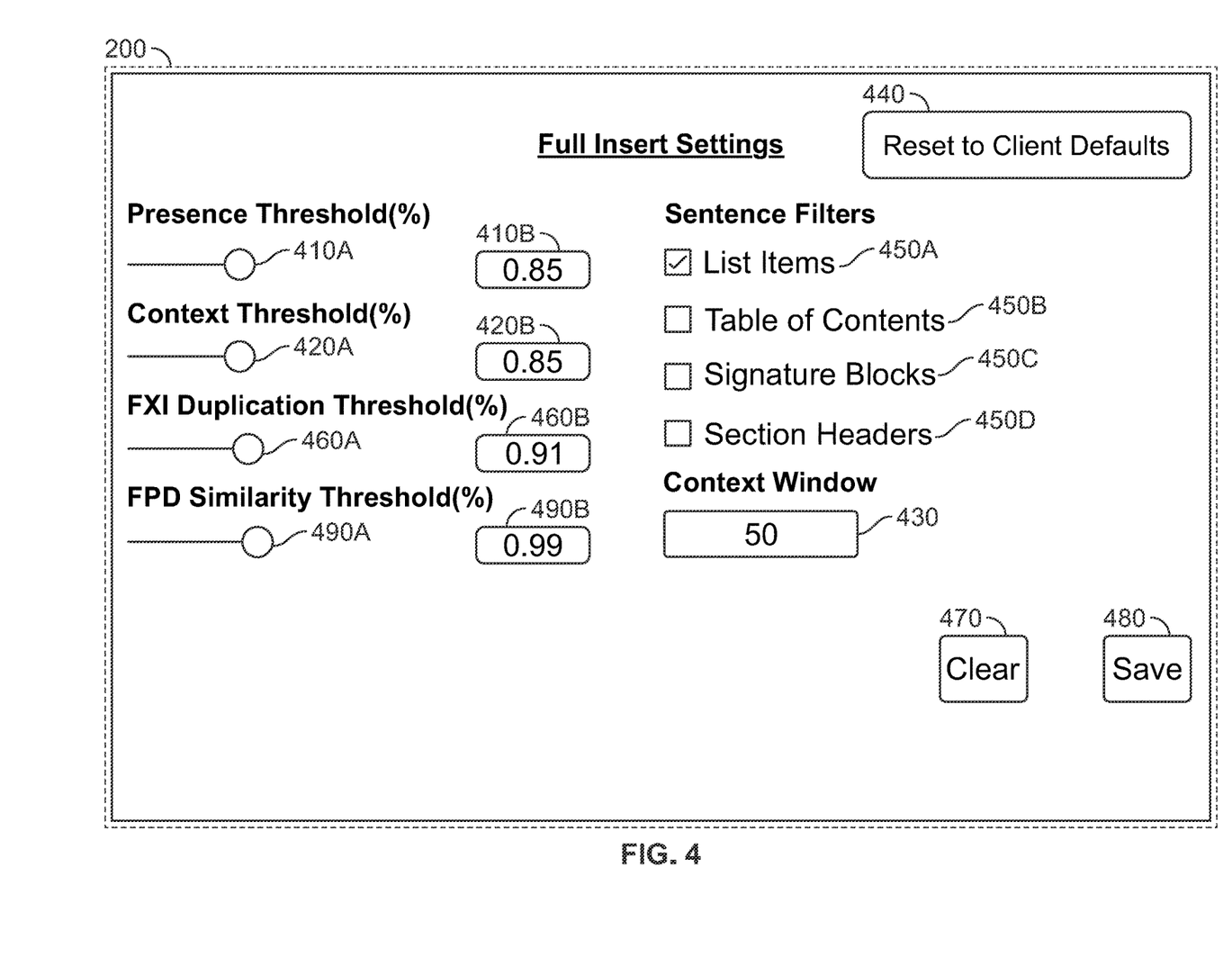
FIG. 4 is a screen capture of a user interface for selecting a full edit setting at a model level, according to some embodiments.

FIG. 4 is a screen capture of a user interface 200 for selecting a full edit setting at a model level, according to some embodiments. According to some embodiments, clause edit parameters are set at the model level and the cluster level. Model level values may be defaults for all clusters. Global level values may be defaults for all models (e.g., global level values apply across the entire customer environment). Model level values may be defaults for all clusters. As shown in FIG. 4, a user may be able to adjust one or more clause edit parameters, including a presence threshold, context threshold, context window, sentence filter, full edit duplication threshold, and full paragraph deletion similarity threshold, for example. The user interface 200 may also include a button 440 to reset the parameter values to certain default values, a clear button 470 to remove or clear the current parameter values, or a save button 480 to commit the parameter values in the edit suggestion system.

As used herein, a "cluster" may refer to a set of text from multiple text documents within a corpus of text documents that refer to or relate to a similar concept. Each cluster from the seed database may identify a concept associated with a full edit, such as a full sentence insertion. For example, a cluster may indicate the concept of an intellectual property rights provision of an agreement with an ownership provision.

A presence threshold parameter may indicate a minimum threshold for indicating the absence of a concept within a document or text under analysis. If the minimum presence threshold is exceeded, then the edit suggestion system determines that the concept is present in the text under analysis. If the minimum presence threshold is not met, then the edit suggestion system may determine that a concept is not present in the text under analysis and suggest a full edit insertion to apply to the text under analysis. As shown in FIG. 4, a graphical input element (410A, 410B) may be provided in a GUI of user interface 200 to enable a user to select a presence threshold. As shown in FIG. 4, the graphical input element may be a slider bar 410A or a text box 410B.

In some embodiments, the presence threshold may serve as a benchmark for whether or not some text exists in a DUA. For example, and for illustrative purposes, one cluster of similar edit data may not be showing up in contracts when the user would like it to because the editing system thinks the gist of the edit data is already in the document. To cause the text to be inserted, the presence threshold may be increased, in effect requiring that a closer version of the cluster text exists in the document. On the next run, the system would evaluate the DUA and not find text with a similarity close enough to the cluster text to discard the cluster text, causing the system to insert the edit suggestion A context threshold parameter may further specify the location of a concept from a cluster in a DUA or text under analysis, e.g., in a text immediately preceding or following a statement under analysis in a text under analysis. If a statement under analysis in a text under analysis matches surrounding text in one or more documents in the cluster, and the presence threshold is not met, then the edit suggestion system may propose a full edit operation at or near the location of the statement under analysis in the text under analysis. As shown in FIG. 4, a graphical input element (420A-B) may be provided in a GUI of user interface 200 to enable a user to select a context threshold. As shown in FIG. 4, the graphical input element may be a slider bar 420A or a text box 420B.

The context threshold parameter may be used by the edit suggestion system to compare what is before, after, or before and after a SUA to determine if a similar edit sample from the database might be a good match and thus a good place for an edit suggestion. For example, consider the sentence "This is a test." and it is surrounded by two sentences: "My first sentence is here. This is a test. Now here is the second sentence.". The "full context" would encompass both the first and third sentences and the edit suggestion system would consider both bounding sentences when looking for good matches in the database of previous edits. If a match or matches are found with similar bounding text, but the similarity between the two texts is not higher than the context threshold, then the system may make an edit suggestion on the basis that it has identified a SUA where an edit of significant difference can be made (difference between the SUA and the edit sentence).

A context window parameter may be used in conjunction with the context threshold parameter to further specify a how much of the preceding or following text to review to evaluate the context threshold. For example, the context window may be 50, which indicates that the edit suggestion system should review the preceding or following 50 tokens (e.g., words, terms, or other smaller units of text) to a statement under analysis to determine whether the context threshold has been met. As shown in FIG. 4, a graphical input element (430) may be provided in a GUI of user interface 200 to enable a user to select a context window. As shown in FIG. 4, the graphical input element 430 may be a text box. In other embodiments, the graphical input element may be a slider bar or another interactive feature.

In some embodiments, the context window controls the number of tokens (words, terms, or other smaller units of text, to copy from this paragraph) that extend before or after a SUA. Changing this on a cluster level can be helpful in trimming the "window" (length of text on either side of the SUA) to better match with text in the database.

For example, consider a series of very short sentences: "Contracts are fun. They add value. They are great." where the SUA is "They add value.", In some instances, it may not be desirable to consider text that is 3-4 sentences' length away because those are still within the range of perhaps 25 tokens. By trimming the context window (how wide of a scope the system looks at the text wrapping the SUA), the system can be more intentional with its matching against the database and thus increase the likelihood of it selecting a good match and creating a good edit suggestion. The presence threshold and context threshold may be values from 0 to 1, or scaled from 0 to 100. In some embodiments, presence and context thresholds are generally set to default at around 85% (0.85), which may be regularly adjusted based on client needs.

A sentence filter may specify portions of or locations within a text under analysis to exclude from analysis by the edit suggestion system. For example, a user may specify one or more portions of a document that should be ignored, such as a set of list items, a table of contents, signature blocks, addendum, or headers of a document. In some embodiments, a sentence filter may instead specify portions of or locations within a text under analysis to be considered by the edit suggestion system. For example, a user may specify one or more portions of a document that should be considered, such as a paragraph or a section. As shown in FIG. 4, graphical input elements 450A-D may be provided in a GUI of user interface 200 to enable a user to select portions or locations to exclude from analysis.

The full insert duplication threshold parameter relates to identifying whether text for proposed insertion (e.g., a full paragraph or full sentence insertion) into a DUA is already present in the DUA, i.e. a duplicate. For example, in some embodiments, the edit suggestion system may determine a duplication confidence value as to whether text in a proposed full insert edit operation is a duplicate of text in the DUA, and proceed with the full insert edit operation so long as the duplication confidence value is below the duplication threshold value. In some embodiments, the duplication threshold value may be set in the user interface using an interactive graphical input element, such as a slider bar 460A or a text box 460B.

The full paragraph deletion similarity threshold parameter relates to identifying whether text in a DUA is sufficiently similar to a text in the training samples associated with a full paragraph deletion edit operation. For example, in some embodiments, the edit suggestion system may evaluate that text should be deleted from the DUA by determining a similarity value between the text in the DUA to text that had been deleted in one or more training samples, and proceeding with the full paragraph deletion if the similarity value meets or exceeds the similarity threshold. In some embodiments, the FPD similarity threshold value may be set in the user interface using an interactive graphical input element, such as a slider bar 490A or a text box 490B.

Figure 5:
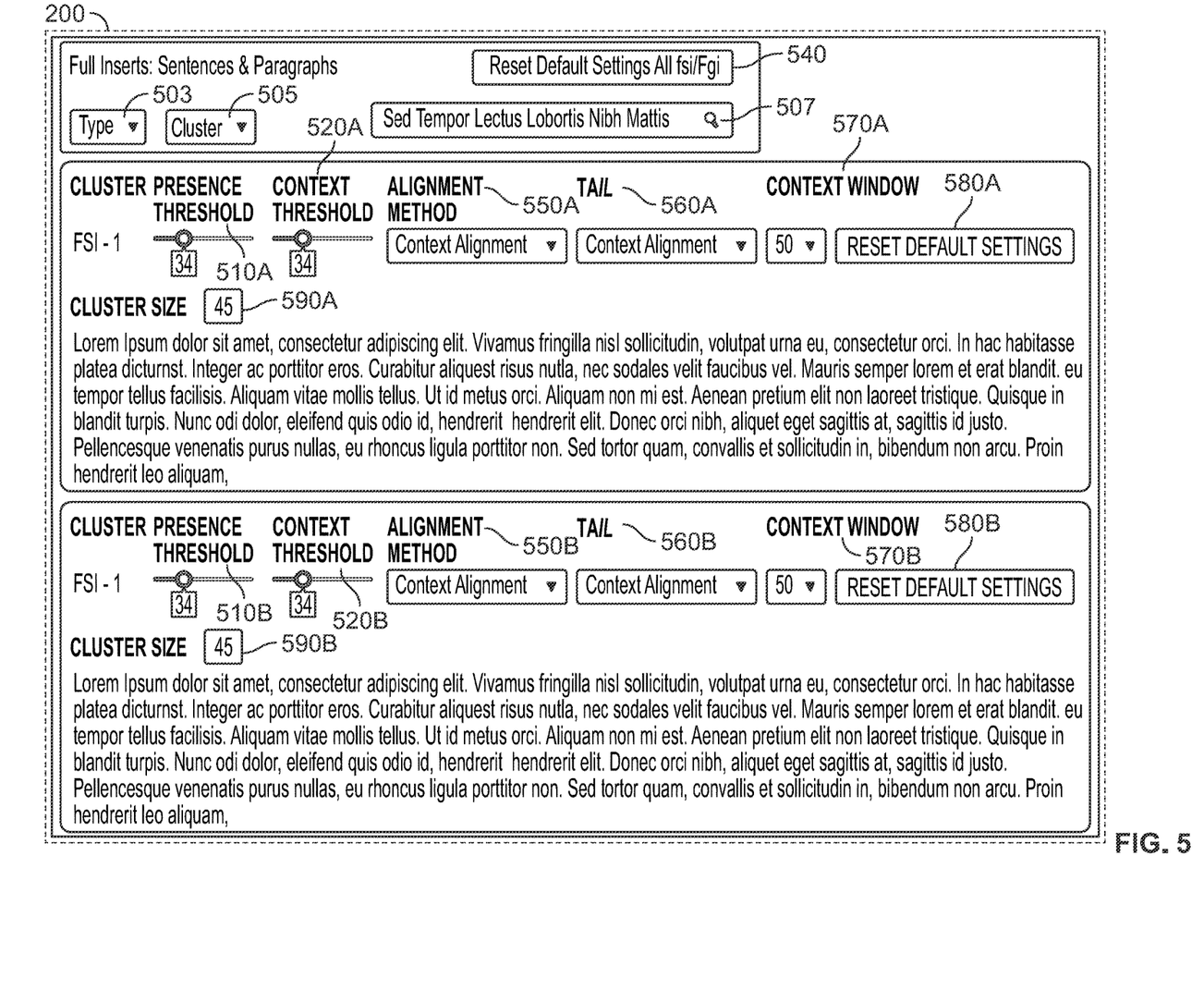
FIG. 5 is a screen capture of a user interface for selecting a full edit setting at a cluster level, according to some embodiments.

FIG. 5 is a screen capture of a user interface 200 for selecting a full edit setting at a cluster level, according to some embodiments. Cluster level defaults may be written to each cluster member. For example, a PATCH call may cause an update to all of that cluster's members with the values in an attached JSON object. A cluster may refer to a full chunk of text such as a sentence, paragraph, or an addendum to a document, which may comprise a plurality of tokens. An interactive element may be displayed that allows a user to choose a cluster type, such as dropdown element 503. According to some embodiments, a user can choose a cluster type from among the cluster types: full sentence insertion (FSI), full paragraph insertion (FPI), full addendum insertion, or all to filter "Full Insert" clusters. Alternatively, a user may choose not to select a filter. When a filter is selected, all clusters that match the filter are displayed, e.g., cluster 1 to cluster N. Once a type selection is made, a cluster can be selected to further limit the display list to one or more clusters, such as using dropdown element 505. Additionally, a user can use search element 507 to filter the result list to clusters that contain sentences that contain the word or words provided. Where multiple terms are used, the search may default to an "AND" search.

For each cluster, a user can edit one or more parameters including a presence threshold (510A-B) and context threshold (520A-B) as described above for cluster parameters at the model level. In addition, a user can specify an alignment method (550A-B), tail (560A-B), and context window (570A-B) of each cluster. Edits made to the interactive element in the GUI may be immediately persisted.

The alignment method parameter may include a list of several options, one or none of which may be selected using input element 550. Alignment options may include: Before Context Only, After Context Only, Before & After Context, and Tail. For the full edits, such as a FSI or FPI, the alignment option may specify how to align the statement under analysis with one or more training texts in the selected cluster. The before context refers to the text that typically comes before an insertion, whereas an after context refers to the text that typically comes after an insertion. Accordingly, the before context specifies that the alignment between the training data text and the statement under analysis occur such that the insertion edit operation is applied after the statement under analysis, and the after context specifies that the alignment occur such that the insertion edit operation is applied before the statement under analysis. The before and after specifies that the alignment may be performed such that the insertion occurs before or after a statement under analysis. Additionally, the tail alignment specifies that the alignment may be performed such that the insertion is suggested to occur at the end of a document or a specific portion of the document.

If the selected alignment method is Tail, a Tail drop down list (560) may be made available with one or more selectable options, including: None, List, Paragraph, Section, and Document. If "list" is selected, then the insertion is proposed at the end of a list. If "Paragraph" is selected, then the insertion is proposed at the end of a paragraph. If "Section" is selected, then the insertion is proposed at the end of a section. If "Document" is selected, then the insertion is proposed at the end of a DUA.

A user can click an information button associated with a cluster in order to see the cluster size (e.g., number of training texts in the cluster) and a sample sentence from the cluster. The sentence may not be editable. In some embodiments, the system may display this information without selecting an information button or interacting with another user interface element. For example, cluster size interactive element 590A-B shown in FIG. 5 displays the number of training texts in the cluster. In some embodiments, a user may be able to adjust the cluster size using interactive element 590A-B, e.g., by entering a new number or adding or removing training texts from the cluster.

Figure 6:
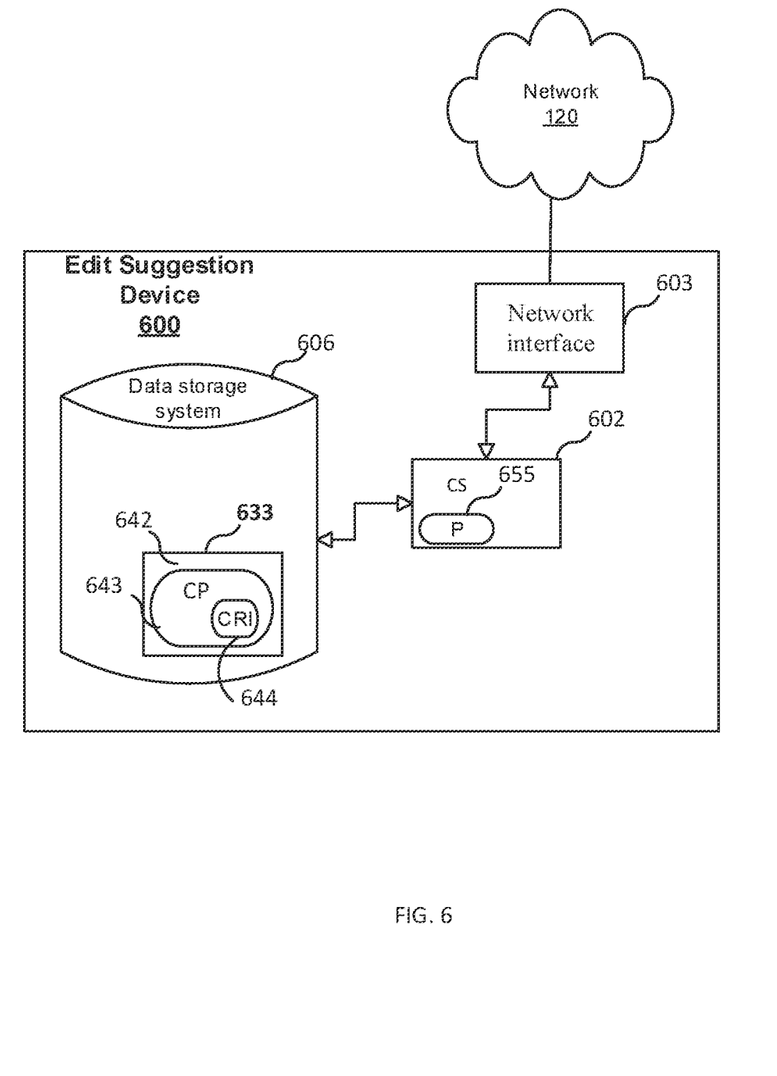
FIG. 6 is a block diagram illustrating an edit suggestion device, according to some embodiments.

The user interface 200 may also include a button 580A-B to reset the parameter values for each cluster to certain default values FIG. 6 is a block diagram illustrating an edit suggestion device, according to some embodiments. In some embodiments, device 600 is application server 101. As shown in FIG. 6, device 600 may comprise: a data processing system (DPS) 602, which may include one or more processors 655 (e.g., a general purpose microprocessor and/or one or more other data processing circuits, such as an application specific integrated circuit (ASIC), field-programmable gate arrays (FPGAs), and the like); a network interface 603 for use in connecting device 600 to network 120; and local storage unit (a.k.a., "data storage system") 606, which may include one or more non-volatile storage devices and/or one or more volatile storage devices (e.g., random access memory (RAM)). In embodiments where device 600 includes a general purpose microprocessor, a computer program product (CPP) 633 may be provided. CPP 633 includes a computer readable medium (CRM) 642 storing a computer program (CP) 643 comprising computer readable instructions (CRI) 644. CRM 642 may be a non-transitory computer readable medium, such as, but not limited to, magnetic media (e.g., a hard disk), optical media (e.g., a DVD), memory devices (e.g., random access memory), and the like. In some embodiments, the CRI 644 of computer program 643 is configured such that when executed by data processing system 602, the CRI causes the device 600 to perform steps described herein (e.g., steps described above and with reference to the flow charts). In other embodiments, device 600 may be configured to perform steps described herein without the need for code. That is, for example, data processing system 602 may consist merely of one or more ASICs. Hence, the features of the embodiments described herein may be implemented in hardware and/or software.

Figure 7:
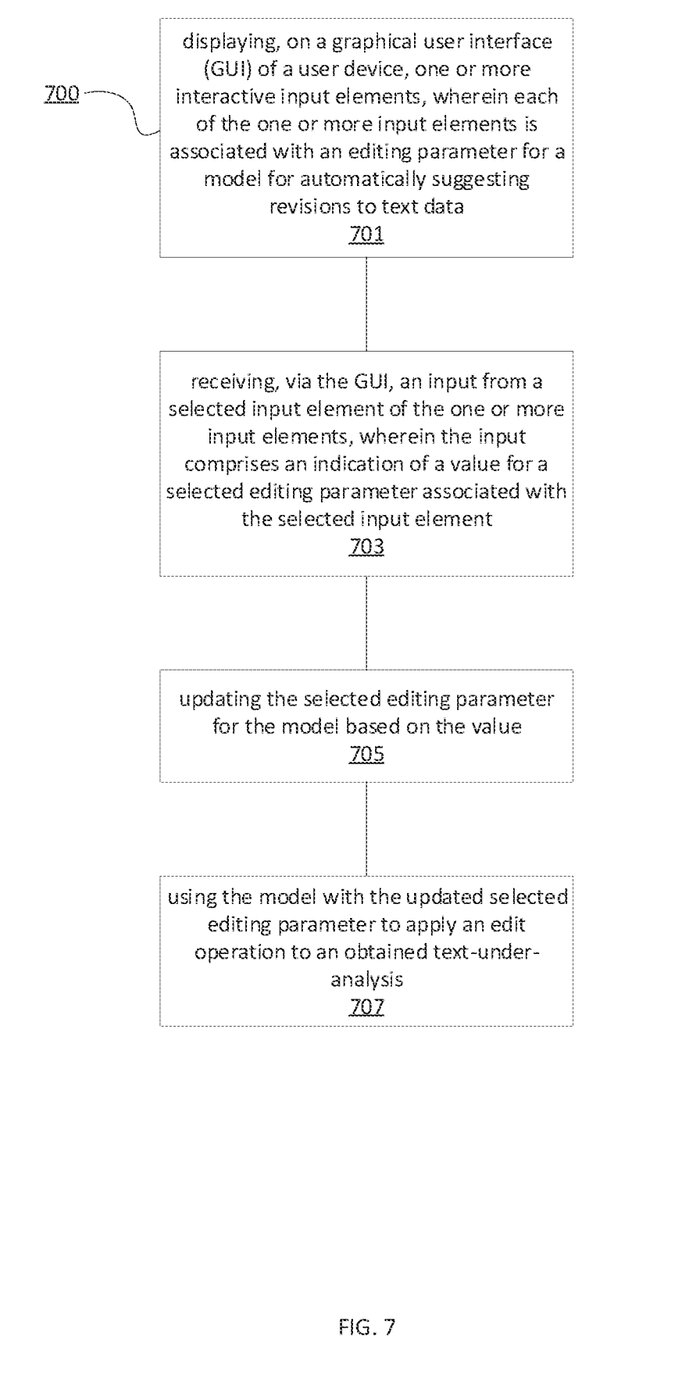
FIG. 7 is a flow diagram of a method, according to some embodiments.

FIG. 7 is a flow diagram of a method, according to some embodiments. In some embodiments, the method 700 may be performed by edit suggestion device 600 or system 100. According to some embodiments, method 700 is for updating an editing parameter for a model for automatically suggesting revisions to text data.

Step 701 comprises displaying, on a graphical user interface (GUI) of a user device, one or more interactive input elements, wherein each of the one or more input elements is associated with an editing parameter for a model for automatically suggesting revisions to text data. Example models are described above in connection with FIG. 2, and the model may be selected by the user. In some embodiments, the GUI may be on a user interface and display one or more interactive input elements on a as described above in connection with FIGS. 2-5.

Step 703 comprises receiving, via the GUI, an input from a selected input element of the one or more input elements, wherein the input comprises an indication of a value for a selected editing parameter associated with the selected input element. As discussed above, the value may be specified by a user using one or more interactive input elements associated with an editing parameter.

Step 705 comprises updating the selected editing parameter for the model based on the value. For example, the model may be adjusted according to the editing parameter in order to more accurately suggest appropriate revisions to a text under analysis in accordance with a user's playbook.

Step 707 comprises using the model with the updated selected editing parameter to apply an edit operation to an obtained text-under-analysis.

According to some embodiments, the editing parameters may be stored in a database. Set forth in table 1, below, is an example of JSON code that controls storing of editing parameters in a database. As shown below, a number of parameters may be stored at different levels: client/global, model, and cluster.

TABLE 1

Example Editing Parameters

```
{
  "global": {
    "name": "BlackBoilerTest",
    "companyLogo": "https://www.blackboiler.com/logos",
    "companyLink": "https://www.blackboiler.com/",
    "companyUrl": "https://www.blackboiler.com/",
    "clusterEditParameters": {
    "context_size": "50",
```

TABLE 1-continued

Example Editing Parameters

```
    "context_threshold": "0.85",
    "presence_threshold": "0.85"
  },
  "pointEditParameters": {
    "similarity": "0.56",
    "accept_bucket_size": "25",
    "reject_bucket_size": "25",
    "revise_bucket_size": "25",
    "accept_weight": 2,
    "reject_weight": 2,
    "revise_weight": 3
  },
  "sentenceFilters": {
    "list_items": true,
    "table_of_contents": false,
    "signature_blocks": false,
    "section_headers": false
  }
},
"model": {
  "id": "602fe11bf554de005a020001",
  "contractType": "nda",
  "dateCreated": "2021-06-17T13:52:05.327Z",
  "dateModified": "2020-06-17T13:52:05.327Z",
  "stage": "published",
  "userCreated": "name@domain.com",
  "userModified": "name@domain.com",
  "name": "TestModel1",
  "clusterEditParameters": {
    "context_size": "50",
    "context_threshold": "0.96",
    "presence_threshold": "0.96"
  },
  "pointEditParameters": {
    "similarity": "0.67",
    "accept_bucket_size": "40",
    "reject_bucket_size": "40",
    "revise_bucket_size": "40",
    "accept_weight": 2,
    "reject_weight": 2,
    "revise_weight": 3
  },
  "sentenceFilters": {
    "list_items": true,
    "table_of_contents": false,
    "signature blocks": false,
    "section_headers": false
  }
},
"training": [
  {
    "training_id": "T_17001",
    "model_id": "602fe11bf554de005a020001",
    "sentence": "16.  ",
    "edit_type": "revise",
    "edited_sentence": "Company acknowledges that Third Party and
its Representatives may be in the business of purchasing, investing
in, managing and operating entities which may have similar or
competing technologies, products or services as those offered by
Company, and that such entities may pursue paths regarding their
technologies, products or services that are competitive with
Company. ",
    "file": "Project X NDA.docx",
    "owner": "BB",
    "train_type": "FSI",
    "note": "",
    "context_before": " 16.   ",
    "context_following": "Third Party Beneficiaries. This Agreement
will be for the benefit of the Parties and their respective managers
and members, certain inventors engaged by the Company, and any
entities affiliated with or under common ownership with the
Company (collectively, the \"Affiliates\").",
    "sentno": 678,
    "contno": 0,
    "rownum": 6245,
    "sent_id": 12,
    "chunk_id": 0,
    "doc_id": 0,
    "para_id": 9,
    "coord_compact": "0-9-12",
    "fsi_clusterid": "3",
    "fpi_clusterid": "",
    "ver": 1,
    "model_deprecated": "TestModel1",
    "source_file": "TestModel1-2021-03-24T22:10:22-18882395.xlsx",
    "date_added": "2020-06-19T00:00:00.000Z",
    "date_modified": "2020-06-19T00:00:00.000Z",
    "user_added": "name@domain.com",
    "user_modified": "name@domain.com"
  },
  {
    "training_id": "T_17001",
    "model_id": "602fe11bf554de005a020001",
    "sentence": "16.  ",
    "edit_type": "revise",
    "edited_sentence": "Company acknowledges that Third Party and
its Representatives may be in the business of purchasing, investing
in, managing and operating entities which may have similar or
competing technologies, products or services as those offered by
Company, and that such entities may pursue paths regarding their
technologies, products or services that are competitive with
Company. ",
    "file": "Project X NDA.docx",
    "owner": "BB",
    "train_type": "FSI",
    "note": "",
    "context_before": " 16.   ",
    "context_following": "Third Party Beneficiaries. This Agreement
will be for the benefit of the Parties and their respective managers
and members, certain inventors engaged by the Company, and any
entities affiliated with or under common ownership with the
Company (collectively, the \"Affiliates\").",
    "sentno": 678,
    "contno": 0,
    "rownum": 6245,
    "sent_id": 12,
    "chunk_id": 0,
    "doc_id": 0,
    "para_id": 9,
    "coord_compact": "0-9-12",
    "fsi_clusterid": "4",
    "fpi_clusterid": "",
    "ver": 1,
    "model_deprecated": "TestModel1",
    "source_file": "TestModel1-2021-03-24T22:10:22-18882395.xlsx",
    "date_added": "2020-06-19T00:00:00.000Z",
    "date_modified": "2020-06-19T00:00:00.000Z",
    "user_added": "name@blackboiler.com",
    "user_modified": "name@blackboiler.com",
    "alignment_mode": 1,
    "context_size": 35,
    "context_threshold": 0.86,
    "presence_threshold": 0.39,
    "tail_type": "Not Set"
  },
  {
    "training_id": "T_17002",
    "model_id": "602fe11bf554de005a020001",
    "sentence": "The undersigned further agrees that it will not
interfere with any business of the Company through the use of any
Information or knowledge acquired under this Agreement nor use
any such Information for its own account.",
    "edit_type": "revise",
    "edited_sentence": "Notwithstanding the foregoing, Company
acknowledges that you and your affiliates may be in the business of
purchasing, investing in, managing and operating entities which
may have similar or competing technologies, products or services as
those offered by Company, and that such entities may pursue paths
regarding their technologies, products or services that are
competitive with Company. ",
    "file": "Project X NDA.docx",
    "owner": "BB",
    "train_type": "FSI",
    "note": "",
    "context before": " 3 The undersigned further agrees that it will not
interfere with any business of the Company through the use of any
```

TABLE 1-continued

Example Editing Parameters

```
Information or knowledge acquired under this Agreement nor use
any such Information for its own account.",
    "context_following": "",
    "sentno": 678,
    "contno": 0,
    "rownum": 6245,
    "sent_id": 12,
    "chunk_id": 0,
    "doc_id": 0,
    "para_id": 9,
    "coord_compact": "0-9-12",
    "fsi_clusterid": "4",
    "fpi_clusterid": "",
    "ver": 1,
    "model_deprecated": "TestModel1",
    "source_file": "TestModel1-2021-03-24T22:10:22-18882395.xlsx",
    "date_added": "2020-06-19T00:00:00.000Z",
    "date_modified": "2020-06-19T00:00:00.000Z",
    "user_added": "name2@domain.com",
    "user_modified": "name2@domain.com",
    "alignment_mode": 1,
    "context_size": 65,
    "context_threshold": 0.86,
    "presence_threshold": 0.39,
    "tail_type": "Not Set"
    }
  ]
}
```

As shown in Table 1 above, the 'similarity' parameter shows up under both the 'global' and 'model' sections. As discussed above, in some embodiments the system may apply parameters in the following priority: cluster>model>global parameters. Accordingly, in the example above the '0.67' model similarity value will be used instead of the global similarity value of '0.56' when the edit suggestion system processes documents using this model.

Additionally, under the 'training' section, there are three objects. The first has 'training_id' of 'T_17001'. Comparing this to the other two, those two have five fields at the end that the first one does not have. When applying these edit parameters, the object with training_id 'T_17001' will default to the higher hierarchical level (in this case model). For the other two however, those last fields will be applied, overruling the model's 'context_size', 'context_threshold', and 'presence_threshold' fields saved at the model and global levels.

The following is a summary of various embodiments described herein:

1. A method for updating an editing parameter for a model for automatically suggesting revisions to text data, the method comprising:

displaying, on a graphical user interface (GUI) of a user device, one or more interactive input elements, wherein each of the one or more input elements is associated with an editing parameter for a model for automatically suggesting revisions to text data;

receiving, via the GUI, an input from a selected input element of the one or more input elements, wherein the input comprises an indication of a value for a selected editing parameter associated with the selected input element;

updating the selected editing parameter for the model based on the value; and applying the model with the updated selected editing parameter to suggest a revision to an obtained text-under-analysis.

2. The method of embodiment 1, wherein the selected editing parameter comprises a bucket size, the value comprises a numeric value, and the method further comprises:

determining, from a corpus of text documents, that a bucket of text documents comprising a number of text documents equal to or greater than the numeric value comprise a point edit operation or a reject edit operation; and suggesting the point edit operation or the reject edit operation to the obtained text-under-analysis in response to the determining.

3. The method of embodiment 2, wherein the point edit operation is one of an accept, reject, or revise edit operation.

4. The method of embodiment 2, wherein the input further comprises an indication of a second value for a second selected editing parameter associated with a second selected input element, wherein the second selected editing parameter comprises a second numeric value corresponding to a weight of the bucket size editing parameter, the method further comprises:

applying the numeric weight to the bucket of text documents, and wherein the suggesting the point edit operation is further in response to the applying the numeric weight to the bucket of text documents.

5. The method of embodiment 1, wherein the selected editing parameter comprises a similarity score, the value is a minimum threshold similarity score, and the method further comprises:

determining, from a corpus of text documents, that one or more text documents comprising a point edit operation has a similarity score with the text-under-analysis that meets or exceeds the minimum threshold similarity score; and, suggesting the point edit operation to the obtained text-under-analysis in response to the determining.

6. The method of embodiment 1, wherein the selected editing parameter comprises a presence threshold, the value indicates a minimum threshold presence score, and the method further comprises:

obtaining, from a corpus of text documents, a cluster identifying a concept and having an associated full edit operation;

calculating a presence score for the concept in the text-under-analysis; and suggesting the full edit operation to the text-under-analysis when the calculated presence score is below the minimum threshold presence score.

7. The method of embodiment 1, wherein the selected editing parameter comprises a context threshold, the value indicates a minimum context score, and the method further comprises:

obtaining, from a corpus of text documents, a cluster identifying a concept and having an associated full edit operation;

obtaining, for a document in the corpus of text documents, one or more neighbor tokens in a text preceding and/or following the identified concept;

calculating a context score for the text-under-analysis by comparing one or more tokens in the text-under-analysis to the one or more obtained neighbor tokens;

suggesting the full edit operation to the text-under-analysis when the calculated context score meets or exceeds the minimum threshold context score.

8. The method of embodiment 7, wherein the input further comprises an indication of a second value for a second selected editing parameter from a second selected input element, wherein the second selected editing parameter comprises a second numeric value corresponding to a context window editing parameter, and wherein the obtaining the one or more neighbor tokens comprises obtaining a number of neighbor tokens at least equal to the second numeric value.

9. The method of embodiment 1, wherein the selected editing parameter comprises an alignment method associated with an identified cluster, and the value indicates one of: a before context, an after context, a before and after context, or a tail alignment method.

10. The method of embodiment 1, wherein the selected editing parameter comprises an alignment method associated with an identified cluster and the value indicates one or more of a list, paragraph, section, or document tail alignment method.

11. A system comprising:
    a processor; and
    a non-transitory computer-readable medium coupled to the processor, wherein the processor is configured to perform any one of the methods recited in embodiments 1-10.

While various embodiments of the present disclosure are described herein, it should be understood that they have been presented by way of example only, and not limitation. Thus, the breadth and scope of the present disclosure should not be limited by any of the above-described embodiments. Generally, all terms used herein are to be interpreted according to their ordinary meaning in the relevant technical field, unless a different meaning is clearly given and/or is implied from the context in which it is used. All references to a/an/the article, element, apparatus, component, layer, means, step, etc. are to be interpreted openly as referring to at least one instance of the article, element, apparatus, component, layer, means, step, etc., unless explicitly stated otherwise. Any combination of the above-described elements in all possible variations thereof is encompassed by the disclosure unless otherwise indicated herein or otherwise clearly contradicted by context.

The invention claimed is:

1. A method for updating an editing parameter for a model for automatically suggesting revisions to text data, the method comprising:
    displaying, on a graphical user interface (GUI) of a user device, one or more interactive input elements, wherein each of the one or more input elements is associated with an editing parameter for a model for automatically suggesting revisions to text data;
    receiving, via the GUI, an input from a selected input element of the one or more input elements, wherein the input comprises an indication of a value for a selected editing parameter associated with the selected input element;
    updating the selected editing parameter for the model based on the value;
    obtaining a text-under-analysis; and
    automatically applying, using the model with the updated selected editing parameter, an edit operation to the obtained text-under-analysis.

2. The method of claim 1, wherein the selected editing parameter is a bucket size, the value comprises a first numeric value, and the method further comprises:
    determining, from a corpus of texts, that a bucket of texts comprising a number of texts equal to or greater than the first numeric value comprise a point edit operation or a reject edit operation; and
    applying the point edit operation or the reject edit operation to the obtained text-under-analysis in response to the determining.

3. The method of claim 2, wherein the point edit operation is one of an accept, reject, or revise edit operation.

4. The method of claim 2, wherein the input further comprises an indication of a second value for a second selected editing parameter associated with a second selected input element, wherein the second selected editing parameter comprises a second numeric value corresponding to a weight of the bucket size editing parameter, the method further comprises:
    calculating a weighted bucket value by applying the second numeric value to the number of texts; and
    determining that the weighted bucket value is equal to or greater than the first numeric value.

5. The method of claim 1, wherein the selected editing parameter comprises a similarity score, the value is a minimum threshold similarity score, and the method further comprises:
    determining, from a corpus of text documents, that one or more text documents comprising a point edit operation has a similarity score with the text-under-analysis that meets or exceeds the minimum threshold similarity score; and,
    applying the point edit operation to the obtained text-under-analysis in response to the determining.

6. The method of claim 1, wherein the selected editing parameter comprises a presence threshold, the value indicates a minimum threshold presence score, and the method further comprises:
    obtaining, from a corpus of text documents, a cluster identifying a concept and having an associated full edit operation;
    calculating a presence score for the concept in the text-under-analysis; and
    applying the full edit operation to the text-under-analysis when the calculated presence score is below the minimum threshold presence score.

7. The method of claim 1, wherein the selected editing parameter comprises a context threshold, the value indicates a minimum context score, and the method further comprises:
    obtaining, from a corpus of text documents, a cluster identifying a concept and having an associated full edit operation;
    obtaining, for a document in the corpus of text documents, one or more neighbor tokens in a text preceding and/or following the identified concept;
    calculating a context score for the text-under-analysis by comparing one or more tokens in the text-under-analysis to the one or more obtained neighbor tokens; and
    applying the full edit operation to the text-under-analysis when the calculated context score meets or exceeds the minimum threshold context score.

8. The method of claim 7,
    wherein the input further comprises an indication of a second value for a second selected editing parameter from a second selected input element,
    wherein the second selected editing parameter comprises a second numeric value corresponding to a context window editing parameter, and
    wherein the obtaining the one or more neighbor tokens comprises obtaining a number of neighbor tokens at least equal to the second numeric value.

9. The method of claim 1, wherein the selected editing parameter comprises an alignment method associated with an identified cluster, and the value indicates one of: a before context, an after context, a before and after context, or a tail alignment method.

10. The method of claim 1, wherein the selected editing parameter comprises a tail alignment method associated with an identified cluster and the value indicates one or more of a list, paragraph, section, or document tail alignment method.

11. A system comprising:
a processor; and
a non-transitory computer-readable medium coupled to the processor, wherein the processor is configured to:
display, on a graphical user interface (GUI) of a user device, one or more interactive input elements, wherein each of the one or more input elements is associated with an editing parameter for a model for automatically suggesting revisions to text data;
receive, via the GUI, an input from a selected input element of the one or more input elements, wherein the input comprises an indication of a value for a selected editing parameter associated with the selected input element;
update the selected editing parameter for the model based on the value;
obtain a text-under-analysis; and
automatically apply, using the model with the updated selected editing parameter an edit operation to the obtained text-under-analysis.

12. The system of claim 11, wherein the selected editing parameter is a bucket size, the value comprises a first numeric value, and the processor is further configured to:
determine, from a corpus of texts, that a bucket of texts comprising a number of texts equal to or greater than the first numeric value comprise a point edit operation or a reject edit operation; and
apply the point edit operation or the reject edit operation to the obtained text-under-analysis in response to the determining.

13. The system of claim 12, wherein the point edit operation is one of an accept, reject, or revise edit operation.

14. The system of claim 12, wherein the input further comprises an indication of a second value for a second selected editing parameter associated with a second selected input element, wherein the second selected editing parameter comprises a second numeric value corresponding to a weight of the bucket size editing parameter, and the processor is further configured to:
calculate a weighted bucket value by applying the second numeric value to the number of texts; and
determine that the weighted bucket value is equal to or greater than the first numeric value.

15. The system of claim 11, wherein the selected editing parameter comprises a similarity score, the value is a minimum threshold similarity score, and the processor is further configured to:
determine, from a corpus of text documents, that one or more text documents comprising a point edit operation has a similarity score with the text-under-analysis that meets or exceeds the minimum threshold similarity score; and,
apply the point edit operation to the obtained text-under-analysis in response to the determining.

16. The system of claim 11, wherein the selected editing parameter comprises a presence threshold, the value indicates a minimum threshold presence score, and the processor is further configured to:
obtain, from a corpus of text documents, a cluster identifying a concept and having an associated full edit operation;
calculate a presence score for the concept in the text-under-analysis; and
apply the full edit operation to the text-under-analysis when the calculated presence score is below the minimum threshold presence score.

17. The system of claim 11, wherein the selected editing parameter comprises a context threshold, the value indicates a minimum context score, and the processor is further configured to:
obtain, from a corpus of text documents, a cluster identifying a concept and having an associated full edit operation;
obtain, for a document in the corpus of text documents, one or more neighbor tokens in a text preceding and/or following the identified concept;
calculate a context score for the text-under-analysis by comparing one or more tokens in the text-under-analysis to the one or more obtained neighbor tokens; and
apply the full edit operation to the text-under-analysis when the calculated context score meets or exceeds the minimum threshold context score.

18. The system of claim 17,
wherein the input further comprises an indication of a second value for a second selected editing parameter from a second selected input element,
wherein the second selected editing parameter comprises a second numeric value corresponding to a context window editing parameter, and
wherein the obtaining the one or more neighbor tokens comprises obtaining a number of neighbor tokens at least equal to the second numeric value.

19. The system of claim 11, wherein the selected editing parameter comprises an alignment method associated with an identified cluster, and the value indicates one of: a before context, an after context, a before and after context, or a tail alignment method.

20. The system of claim 11, wherein the selected editing parameter comprises a tail alignment method associated with an identified cluster and the value indicates one or more of a list, paragraph, section, or document tail alignment method.

21. The method of claim 1, wherein the selected editing parameter is associated with at least one of a point edit to text data or a full edit to text data.

22. The method of claim 21, wherein the point edit comprises one or more of an accept, reject, or revise edit operation to text data and the full edit comprises one or more of an accept, insertion, or deletion edit operation to text data.

23. The method of claim 21, wherein the point edit corresponds to one or more of a substitution, insertion, or deletion of a word or phrase, and wherein the full edit corresponds to one or more of an insertion or deletion of a full sentence or a full clause.

* * * * *